United States Patent [19]

Bott

[11] 4,143,480
[45] Mar. 13, 1979

[54] CRAWFISH TRAP

[76] Inventor: Daniel A. Bott, 9568 Bonnydune, Shreveport, La. 71116

[21] Appl. No.: 848,459

[22] Filed: Nov. 4, 1977

[51] Int. Cl.² ............................................. A01K 69/10
[52] U.S. Cl. ....................................................... 43/105
[58] Field of Search ................................... 43/100, 105

[56] References Cited

U.S. PATENT DOCUMENTS

| 909,922 | 1/1909 | Merle | 43/105 |
| 2,652,656 | 9/1953 | Glasser | 43/105 |
| 3,427,742 | 2/1969 | Brown | 43/100 |
| 3,903,637 | 9/1975 | Dorsey | 43/105 |

Primary Examiner—Jimmy C. Peters
Attorney, Agent, or Firm—John M. Harrison

[57] ABSTRACT

A crawfish trap which includes a pair of frame members, one of which is fitted with a receiving loop and the other carrying a mating hook for engagement with the receiving loop, both of the frame members having a pair of legs and feet extending from the point of attachment of the loop and hook, respectively, to support the trap netting. The open mesh netting is fitted to the frame and covers the bottom and a portion of all four sides formed by the frame members to define a generally truncated pyramid with an opening in the top of the trap immediately below the frame loop and hook to permit entry of the crawfish. The trap is designed to be submerged in a body of water and located by a float and float line attached to the frame members, which float and line also serve to permit the trap to be lifted from the water for collection of the entrapped crawfish.

20 Claims, 14 Drawing Figures

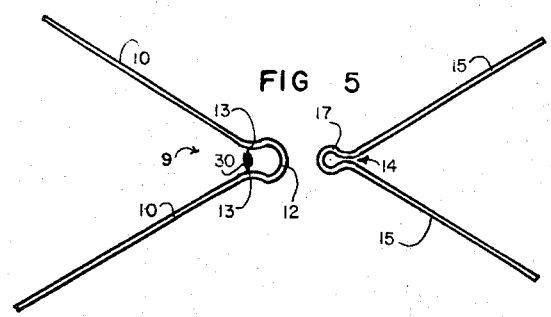
FIG 5
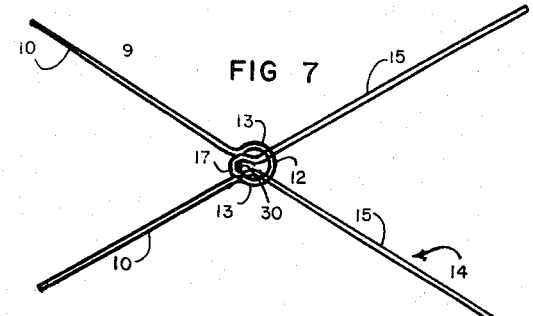
FIG 7
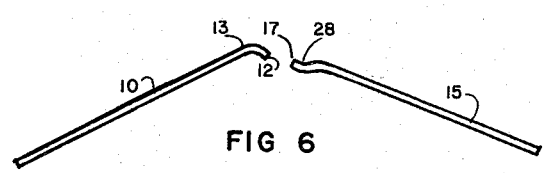
FIG 6
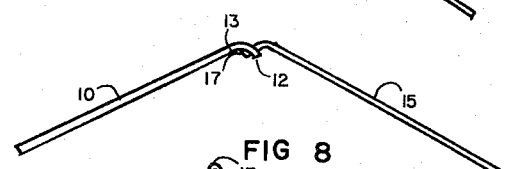
FIG 8
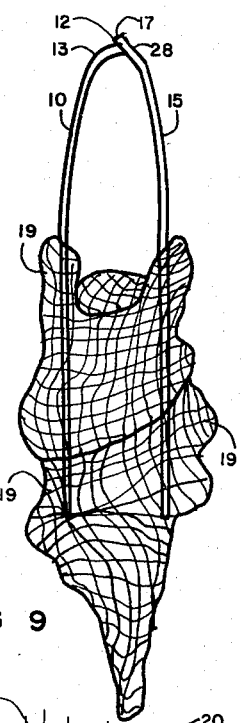
FIG 9
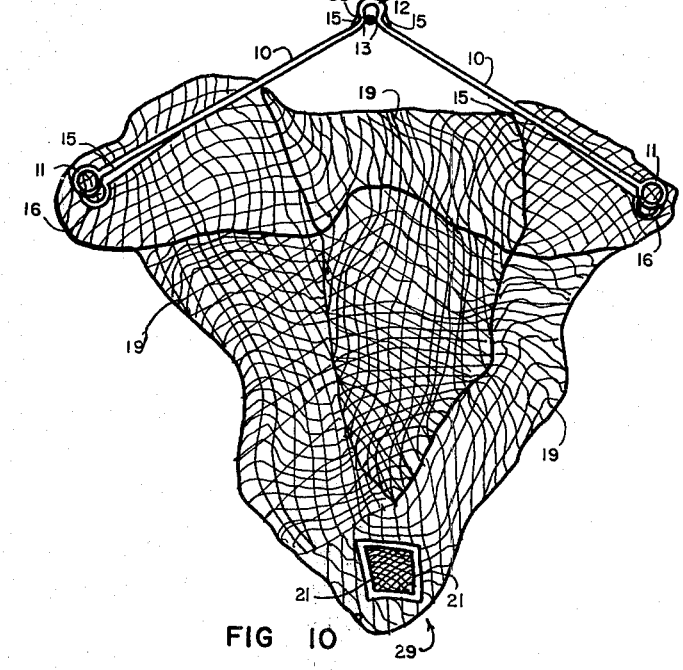
FIG 10
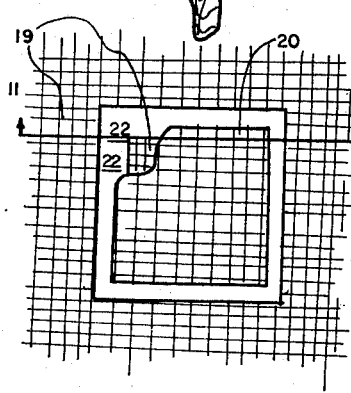
FIG 11
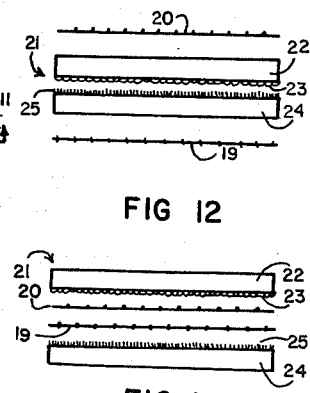
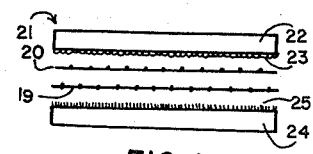
FIG 12
FIG 14
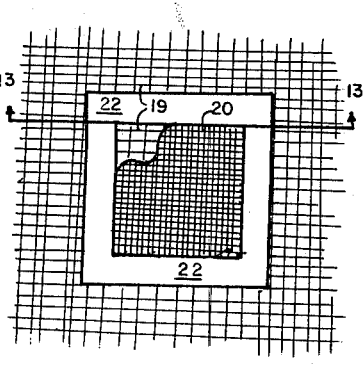
FIG 13

CRAWFISH TRAP

BACKGROUND OF THE INVENTION

1. Field of the Invention

This invention relates to a means for trapping crawfish, and more particularly, to a crawfish trap characterized by a pair of wire frames carrying flexible, open mesh netting, and is generally shaped in the form of a truncated pyramid. The frames are equipped with a frame loop and hook, respectively, which may be disengaged to permit collapse and folding into a storage configuration. When the frame hook and loop are in engagement, the netting carried by the frame members covers the bottom and a substantial portion of the side area of the frames, leaving a top segment open for entry and collection of the crawfish. The crawfish trap is also fitted with a float and line attached to one of the frame members in order to permit the trap to be completely submerged in a body of water and easily located and removed from the water for convenient collection of the crawfish trapped in the net. The pyramid shape of the trap and the location of the opening beneath the top portions of the frame members permits the crawfish to readily enter the trap but makes it very difficult for them to exit the trap until collection is desired.

2. Description of the Prior Art

Heretofore, various traps for crabs, lobsters, crawfish and the like have been known in the prior art. For example, U.S. Pat. No. 1,728,645 to F. P. Ward, et al., discloses a lobster trap formed of a heavy bottom frame with metal bands extending between opposite sides of the frame, and having a wire screen covering the bottom and sides of the trap and an opening provided in the top for entry of the lobsters. Bait is placed in the trap and the trap is then submerged in a water body, whereupon lobsters are permitted to crawl up the sides of the trap and through the opening in the top to reach the bait. Trap doors are also provided in order to permit exit of the smaller lobsters and retention of the larger lobsters in the interior of the trap.

Another lobster trap is illustrated in U.S. Pat. No. 3,992,804 to Dominick J. Senese, which trap consists of a four sided container having open mesh net material on the bottom, sides, and top thereof, and an opening in the top to permit entry of the lobster. The top is secured in closed position by means of a cross pin that is soluble in water to permit release of the top after a predetermined period of submersion in the event the lobster trap is lost, to permit entrapped lobsters to escape.

U.S. Pat. No. 3,605,320 to C. S. Wells describes a crab trap which is characterized by a generally truncated pyramid having mesh sides and bottom, and a top member provided with a plastic shield having a substantially horizontal surface surrounding a downwardly sloping, circular tunnel for entry of the crabs. The shield is formed of a low friction plastic to prevent the crabs from climbing back out of the trap through the entrance tunnel.

While lobster and crab traps are used primarily on the Atlantic coast in a thriving lobster and crab industry, such traps are rarely used in the South and in other areas of the United States for trapping crabs in warm Gulf waters. Furthermore, in the deep South where crawfish are considered to be a delicacy, such traps are almost unknown for taking these crustaceans, the preferred technique for capturing crawfish being the use of seines, barrel-shaped wire mesh commercial traps and crawfish nets of simple construction.

One of the most popular methods used by sportsmen for capturing crawfish is by use of a crawfish net of the design illustrated in FIGS. 1 and 2 of applicant's drawings. Such nets generally consist of a pair of wire frame members carrying an open mesh net at the bottom terminal ends thereof, and are capable of being folded for storage, and selectively opened to spread the net and provide a means for capturing crawfish, as described hereinafter. Conventional crawfish nets such as the one illustrated in FIGS. 1 and 2 are characterized by inefficiency, in that the net area, which is designed without sidewall areas, frequently permits large numbers of crawfish to escape when the frame is touched and the net is lifted from the water. Furthermore, those nets known in the prior art which are characterized by both bottom and side netting or mesh, are frequently designed such that removal of crawfish would be difficult since these traps generally have a top piece fitted with an opening of varying design which readily permits crabs or lobsters to enter but makes extraction of larger numbers of the smaller crawfish somewhat difficult. Furthermore, many of the conventional traps which are designed with both bottom and sidewall netting and stiff frame members are not designed to be folded and readily positioned in a convenient stored configuration, thereby requiring substantial storage room and space.

Accordingly, it is an object of this invention to provide a new and improved crawfish trap which is characterized by a pair of wire frame members capable of being disengaged and folded when not in use, and carrying an open mesh net material which covers the bottom and a portion of the side areas of the frame members when the frame members are engaged and positioned in functional configuration.

Yet another object of this invention is to provide a crawfish trap which is capable of being selectively folded and stored, and subsequently opened and used in the shape of a generally truncated pyramid to trap crawfish.

Yet another object of this invention is to provide a new and improved collapsible crawfish trap which is characterized by a pair of wire frame members, one of which members is fitted with a loop and the other of which carrys a cooperating hook, which hook and loop can be removably fitted together to form a generally truncated pyramid, and which wire frame members also carry an open mesh netting on a portion of the sides and on the bottom thereof to permit crawfish to enter an open area near the top of the frame but which retards exiting of the crawfish from the netting once they are inside the trap.

Still another object of the invention is to provide a folding crawfish trap which is characterized by a pair of wire frame members and an open mesh netting, which frame members selectively cooperate in engagement to form a generally truncated pyramid when the trap is in functional configuration, which trap is further characterized in one embodiment by a bait pocket formed in the bottom netting thereof for isolating the bait from contact with the crawfish entering the trap to slow consumption of the bait by entrapped crawfish.

Another object of this invention is to provide a new and improved folding crawfish trap which is characterized by a pair of cooperating frame members and flexible, open mesh netting, which trap is fitted with an opening in the top thereof to permit crawfish to enter and is also provided with a mesh bait pocket for enclosing the bait to prevent the crawfish from consuming the bait.

Still another object of this invention is to provide a new and improved crawfish trap having a pair of wire frame members, one of which frame members carries a hook and the other of which includes a cooperating loop to permit the frame members to be folded against each other for storing in one configuration, and hooked together and spread for positioning in another functional configuration, which frame members also carry a flexible, open mesh netting across the bottom and on a portion of the sides thereof characterized by an opening in the top thereof beneath the loop and hook of the frame members and disposed in substantially parallel relationship to the bottom of the trap, to permit entry of crawfish, the trap also including a mesh bait pocket secured to the bottom segment of the netting by means of removable fasteners to encapsulate the bait and slow consumption of the bait by crawfish which enter the trap.

SUMMARY OF THE INVENTION

These and other embodiments of the invention are provided in a crawfish trap having the following elements:

1. A first frame member shaped generally in the form of a "V" and having a pair of legs, a pair of feet carried by the ends of the legs and a loop formed at the apex of the "V".

2. A second frame member shaped generally in the form of a "V" and having a pair of legs, a pair of feet at the extended ends of the legs and a hook formed at the apex of the "V" for removable engagement with the loop of the first frame.

3. A flexible, open mesh netting carried by the first frame and second frame and covering the bottom and a portion of the sides of the frame members when the loop and hook are in engagement, to form a generally truncated pyramid having an opening at the top thereof to permit entry and entrapment of crawfish in the interior of the trap.

BRIEF DESCRIPTION OF THE DRAWINGS

The invention will be better understood in view of the following description presented with reference to the accompanying drawings:

FIG. 5 is a top elevation, partially in section, of the top segment of a set of frame members which define the shape of the crawfish trap illustrated in FIGS. 3 and 4, the frame members being in disengaged configuration;

FIG. 6 is a side elevation, partially in section, of the frame members illustrated in FIG. 5;

FIG. 7 is a top view, partially in section, of the top segment of the frame members illustrated in FIGS. 5 and 6, in engaged configuration;

FIG. 8 is a side elevation, partially in section, of the frame members illustrated in FIG. 7;

FIG. 9 is a side elevation of the crawfish trap illustrated in FIGS. 3 and 4, with the frame members in disengaged, folded configuration;

FIG. 10 is a front elevation of the crawfish trap illustrated in FIG. 9;

FIG. 11 is a top elevation, partially in section, of the middle portion of a bottom segment of the crawfish trap netting illustrated in FIG. 3 of the drawing, more particularly showing a preferred method of forming a bait pouch or pocket in the bottom of the trap;

FIG. 12 is a sectional view taken along lines 11—11 in FIG. 11, more particularly illustrating a preferred technique of forming the bait pouch or pocket in the crawfish trap;

FIG. 13 is an alternative preferred configuration of the bait pouch or pocket in the crawfish trap; and FIG. 14 is a sectional view taken along lines 13—13 in FIG. 13 illustrating the alternative preferred configuration of the bait pouch or pocket.

DESCRIPTION OF THE PREFERRED EMBODIMENTS

Figures 1, 2:
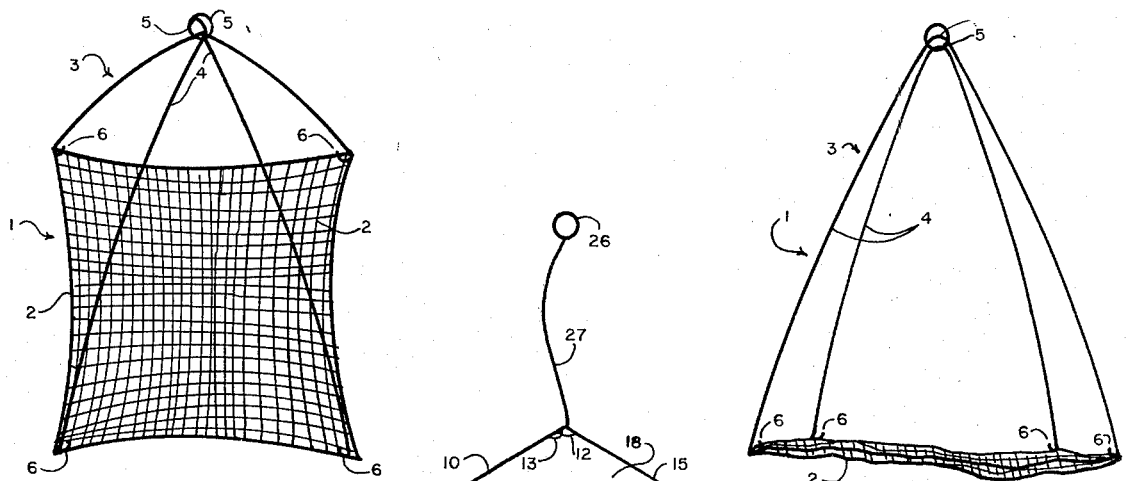
FIG. 1 of the drawings is a perspective view of a conventional crawfish net known in the prior art.
FIG. 2 is a front elevation of the conventional crawfish net illustrated in FIG. 1.

Referring now to FIGS. 1 and 2 of the drawing, a conventional crawfish net, generally illustrated by reference numeral 1, is illustrated with conventional netting 2 on a conventional frame 3, the latter of which is formed of frame legs 4. As illustrated in FIG. 1, frame legs 4 can be spread to open conventional netting 2 in order to place conventional crawfish net 1 in functional configuration. This positioning of conventional netting 2 is made possible by frame loops 5 in frame legs 4, which loops are interlocking, and permit frame legs 4 to be folded as illustrated in FIG. 2. As illustrated in both FIGS. 1 and 2, conventional netting 2 is fitted on frame legs 4 by net loops 6, formed in the ends of frame legs 4.

Figure 4:
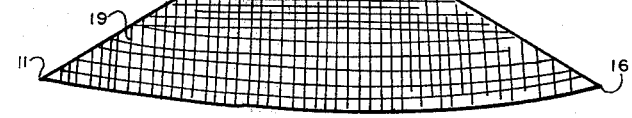
FIG. 4 is a side elevation of the crawfish trap illustrated in FIG. 3.
Figure 3:
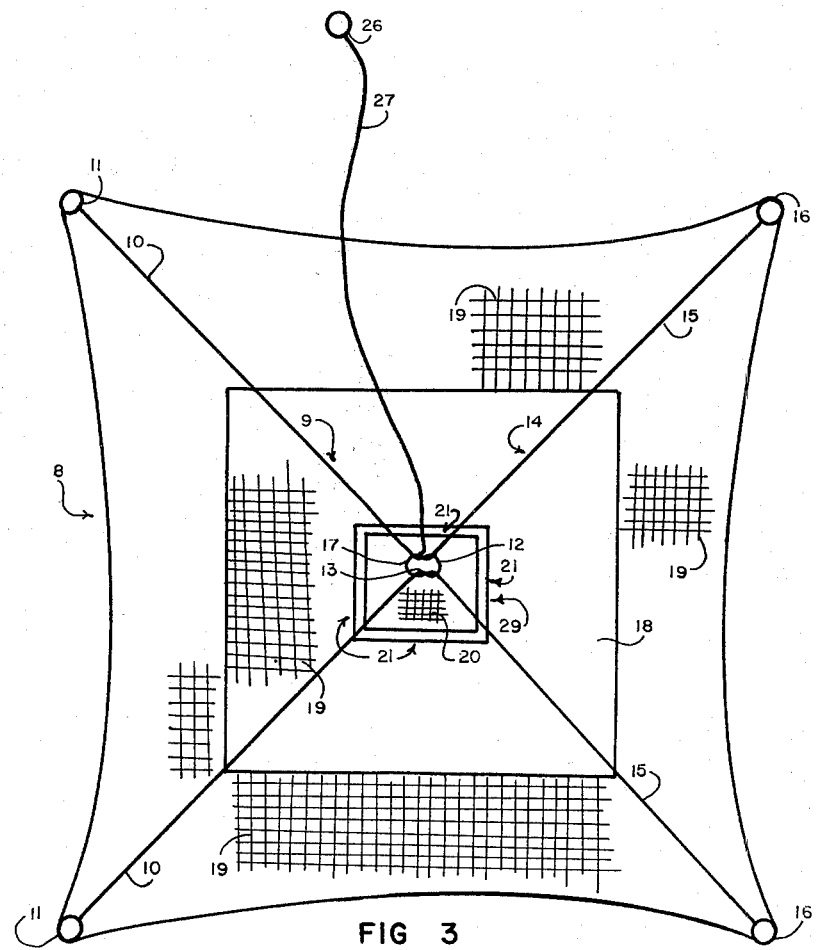
FIG. 3 is a top elevation of the crawfish trap of this invention.

Referring now to FIGS. 3, 4 and 5-8 of the drawings, the crawfish trap of this invention is generally illustrated by reference numeral 8 and includes first frame 9, formed of first frame legs 10, and second frame 14, formed of second frame legs 15. First frame legs 10 are also provided with first frame feet 11, and with a common first frame loop 12, which is shaped to form first frame loop shoulders 13, closed by weld 30, as illustrated in FIGS. 3, 5 and 7 of the drawings. Similarly, second frame legs 15 are fitted with second frame feet 16 and a common second frame hook 17, the latter of which is shaped and fitted with bend 28 to engage first frame loop 12 as illustrated in FIGS. 3, 4, 7 and 8. Trap netting 19 is provided on the bottom and a portion of the sides of crawfish trap 8, leaving an opening 18 in the top of the trap to provide access for the crawfish. Trap netting 19 is preferably fitted to first frame 9 and second frame 14 while second frame hook 17 is engaged with first frame loop 12 and may be sewn in place, but is preferably not attached to first frame 9 and second frame 14, to permit easy collapse for storage. As illustrated in FIGS. 3 and 4 of the drawings, in a preferred embodiment of the invention crawfish trap 8 is formed generally in the shape of a truncated pyramid and is designed to permit crawfish to enter opening 18 while preventing easy exiting of the crawfish from the trap. First frame feet 11 and second frame feet 16 serve to stretch the corners of trap netting 19 and define the bottom of the trap. A float 26 is attached to either first frame 9 or second frame 14 by means of float line 27 in order to mark the location of the submerged trap and to retrieve it when it is desired to collect the entrapped crawfish.

Referring now to FIGS. 5, 6, 9 and 10 of the drawings, it will be appreciated that second frame hook 17 can be quickly and easily disengaged from first frame loop 12 to permit crawfish trap 8 to be folded and hung in stored configuration, much in the same manner as a coathanger and coat is hung on a support bar in a closet. This configuration of crawfish trap 8 permits trap netting 19 to hang loosely from first frame legs 10 and second frame legs 15 until such time as it is desired to again use the crawfish trap, when second frame hook 17 is engaged with first frame loop 12 and crawfish trap 8 placed in functional configuration as illustrated in FIGS. 3 and 4 of the drawings.

The engagement and disengagement of second frame hook 17 from first frame loop 12 is more particularly illustrated in FIGS. 5-8 of the drawings. In order to initially engage second frame hook 17 with first frame loop 12, second frame hook 17 is placed in essentially the same plane as first frame loop 12, as illustrated in FIGS. 5 and 6 of the drawings, and the projecting end of second frame hook 17 is subsequently fitted over the end of first frame loop 12 and positioned under first frame loop shoulders 13, as illustrated in FIGS. 7 and 8 of the drawings, to releasably secure first frame 9 to second frame 14. Bend 28 in second frame hook 17 serves to provide a positive lock between second frame hook 17 and first frame loop 12, and weld 30, joining first frame loop shoulders 13, serves to prevent second frame hook 17 from disengaging first frame loop 12 when crawfish trap 8 is being retrieved while loaded with crawfish. Alternatively, a band or ring can be fitted on first frame loop shoulders 13 to prevent the shoulders from spreading and second frame hook disengaging under load.

In a preferred embodiment of the invention the bait provided in the interior of crawfish trap 8 for attracting crawfish therein is placed in a bait pocket 29 located between a section of bait netting 20 and the bottom segment of trap netting 19, as illustrated in FIGS. 3 and 11-14 of the drawings. In this embodiment it is also preferred to secure bait netting 20 to trap netting 19 by means of fasteners, generally illustrated by reference numeral 21. The bait [not illustrated] is preferably placed between bait netting 20 and trap netting 19 in order to minimize loss of bait due to the feeding of crawfish which have entered the trap by means of opening 18. Two preferred techniques for attaching bait netting 20 to trap netting 19 are illustrated in FIGS. 11 and 12 and FIGS. 13 and 14, respectfully. Referring first to FIGS. 11 and 12 of the drawings, in a preferred method of attachment, bait netting 20 is secured to fastener top 22, which is typically one-half of a loop pile type fastener and is fitted with fastener top loops 23. Fastener bottom 24 is secured to trap netting 19, fastener bottom 24 being fitted with a cooperating fastener bottom pile 25, for engagement with fastener top loops 23. This configuration defines bait pocket 29 and permits a bait material to be placed between bait netting 20 and trap netting 19 within the confines of bait netting fasteners 21 to prevent rapid consumption of the bait by crawfish which have entered the trap.

An alternative method for defining bait pocket 29 in crawfish trap 8 is illustrated in FIGS. 13 and 14 of the drawing, where fastener top 22 and fastener bottom 24 are fitted together over bait netting 20 and trap netting 19 as illustrated, to define bait pocket 29. Furthermore, as illustrated in FIG. 13, the mesh size of bait netting 20 and/or trap netting 19 at the point where bait pocket 29 is defined by bait netting fasteners 21 may be of any suitable size depending upon convenience and the size of the crawfish being taken.

It will be appreciated from a comparison of the conventional crawfish net illustrated in FIGS. 1 and 2, and the crawfish trap of this invention as illustrated in FIGS. 3 and 4 of the drawings, that the latter is far superior to the former in design configuration for entrapment of crawfish. As heretofore described, one of the chief disadvantages in using crawfish nets of the design illustrated in FIGS. 1 and 2 is the propensity for crawfish to quickly exit the net area when the net is approached, touched or lifted to retrieve the crawfish. Accordingly, the successful use of such a net depends upon rapid insertion of a pole or rod beneath conventional frame loops 5 of the net to quickly force the net upward and out of the water using water pressure to keep the crawfish from swimming out of the net during the retrieval process. Experience has shown that if the lifting pole or rod touches conventional frame loops 5 or frame legs 4 prior to the lifting process, that most, if not all of the feeding crawfish will quickly exit the net and immediate retrieval of the net will be to no avail. Furthermore, in some instances, merely approaching the net by wading to a point which is sufficiently close to retrieve the net by manipulation of the rod or pole will cause some crawfish to exit the net. Furthermore, such nets are not generally equipped with a bait pouch or pocket to contain the bait and minimize consumption by feeding crawfish, which necessitates periodic replenishing of bait.

In contrast, referring again to the drawings, the crawfish trap of this invention provides a trap netting 19 which is generally shaped in the form of a truncated pyramid as mounted on first frame 9 and second frame 14 to permit crawfish to crawl up inclined sides and into an opening 18 in trap netting 19 for access to bait which is placed on the bottom of trap netting 19. As heretofore described, the bait is preferably, although not necessarily, placed within a bait pocket 29 defined by bait netting fasteners 21, bait netting 20 and trap netting 19. Furthermore, unlike conventional crawfish net 1 which is designed to be placed in a body of water with conventional frame loops 5 and a portion of conventional frame legs 4 projecting from the surface of the water for access by a lifting pole or rod, crawfish trap 8 is designed to be completely submerged in the water body and located by means of a float 26, which is attached to first frame 9 or second frame 14 by means of a float line 27, as heretofore described. Thus, while conventional crawfish net 1 is limited in use to water bodies of relative shallow depth, crawfish trap 8 is not so limited, and may be used in water of substantially any depth by simply adjusting the length of float line 27 accordingly. Retrieval of crawfish trap 8 is thus made possible by grasping float 26 and float line 27 and hoisting crawfish trap 8 from the water, with little liklihood of losing the entrapped crawfish.

It has been found that there is very little liklihood that entrapped crawfish will exit opening 18 after having entered crawfish trap 8, since crawfish have a tendency to move rapidly in a horizontal plane when disturbed, and this tendency leads to movement from the bait area in the bottom center of crawfish trap 8 to the inside perimeter of the trap when crawfish trap 8 is lifted by means of float 26 and float line 27. Furthermore, water pressure flowing from top to bottom through crawfish trap 8 in the lifting process serves to further insure that very few, if any, crawfish exit the trap by means of opening 18 during the lifting process.

Another advantage of crawfish trap 8 over prior art traps and nets lies in the disengaged storing configuration of the trap. Referring now to FIGS. 2, 9 and 10 of the drawings, it will be appreciated that when conventional crawfish net 1 is collapsed as illustrated, and several such nets are stacked on top of each other, that net loops 6 of frame legs 4 have a tendency to become entangled in the netting of other nets and cause difficulty in disengaging the nets from each other when it is desired to use them. In contrast, the design of crawfish trap 8 includes formation of first frame feet 11 and second frame feet 16 in the form of loops, the ends of the loops being preferably joined to first frame legs 10 and second frame legs 15, respectively, by solder, glue of other techniques, to prevent entanglement with trap netting 19. In a preferred embodiment of the invention first frame 9 and second frame 14 are formed of wire and first frame feet 11 and second frame feet 16 are formed by bending the extended ends of first frame legs 10 and second frame legs 15 in a circle or ellipse with the terminal end of the legs in close proximity to the legs themselves, respectively, to permit soldering or gluing the ends and prevent entanglement of the ends in trap netting 19. Thus, first frame feet 11 and second frame feet 16 serve not only as stretching points to define the shape of the bottom of trap netting 19 but also to prevent entanglement of trap netting 19 when several crawfish traps are collapsed as illustrated in FIGS. 9 and 10, and hung on a rod or pole for storage.

As described above, the trap netting 19 of crawfish trap 8 can be formed of substantially any open mesh net material, but is preferably formed of a flexible material such as nylon or cotton to permit the trap to be collapsed as illustrated in FIGS. 9 and 10 of the drawings. Furthermore, the netting mesh size may be of substantially any convenient size which is larger than the average size of the crawfish to be contained, but is preferably from about one-fourth to about five-eighths of an inch, and most preferably, about one-half inch in size. Furthermore, while access opening 18 may be of substantially any shape, it is preferably formed in a square or a rectangle having an area of from about one-eighth to about one-fourth of the bottom area of the trap; in a most preferred embodiment of the invention, the opening 18 is about one-sixth of the area of the bottom of crawfish trap 8.

Referring again to FIG. 4 of the drawings, it will be appreciated that the angle of inclination of first frame 9 and second frame 14 with respect to the horizontal to define the pitch of the sides of crawfish trap 8 can be of substantially any acute angle. However, an angle of pitch of from about 20° to about 40° is preferred, and in a most preferred embodiment of the invention, the angle of inclination or pitch is about 30°. Similarly, the angle of extension of first frame legs 10 and second frame legs 15 with respect to each other, respectively, can be varied to produce a crawfish trap which is either square or rectangular in shape. However, in a preferred embodiment of the invention the crawfish trap base is square, and the angle of extension between the respective legs is about 90°.

It will be appreciated by those skilled in the art that in another preferred embodiment of the invention first frame 9 and second frame 14 are characterized by first frame legs 10 and second frame legs 15 which are extended and shaped to form first frame feet 11 and second frame feet 16, and are not joined at first frame feet 11 and second frame feet 16, respectively. However, it will be appreciated that support members can be provided to span the distance between first frame feet 11 and between second frame feet 6 as desired, in order to provide additional support for first frame 9 and second frame 14 and to further define the bottom of trap netting 19, should it be desired to use a smaller guage member in the construction of first frame 9 and second frame 14. In a most preferred embodiment of the invention, first frame 9 and second frame 14 are formed of wire of sufficient stiffness to maintain structural integrity, both when second frame hook 17 is in engagement with first frame loop 12 and when crawfish trap 8 is in disengaged, stored configuration as illustrated in FIGS. 9 and 10 of the drawings, without the necessity of utilizing additional supports provided between first frame feet 11 and between second frame feet 16, respectively. In this regard, it is important that first frame feet 11 and second frame feet 16 be shaped such that the surfaces contacting trap netting 19 are larger than the mesh netting in order to prevent first frame feet 11 and second frame feet 16 from projecting through the netting.

Having described my invention with the particularities set forth above, what is claimed is:

1. A crawfish trap comprising:
   (a) A first frame member shaped generally in the form of a "V" defining a first pair of free-standing legs and having a loop formed in the apex thereof;
   (b) A second frame member shaped generally in the form of a "V" defining a second pair of free-standing legs and having a hook formed in the apex thereof for removable engagement with said loop; and
   (c) Open mesh netting covering all of the bottom area and extending upward to cover a portion of the side area and fitted on said first frame member and said second frame member, said netting having an access opening in the top thereof beneath said loop and said hook.

2. The crawfish trap of claim 1 wherein said legs of said first frame member and said second frame member are each provided with feet for engaging said netting.

3. The crawfish trap of claim 1 wherein the portion of said netting forming the bottom of said trap further includes a bait pocket.

4. The crawfish trap of claim 1 wherein:
   (a) said legs of said first frame member and said second frame member are each provided with feet for engaging said netting; and
   (b) the portion of said netting forming the bottom of said trap further includes a bait pocket.

5. The crawfish trap of claim 1 wherein the area of said access opening in said netting is from about one-fourth to about one-eighth as large as the bottom area of said trap and is disposed in essentially parallel relationship to said bottom area.

6. The crawfish net of claim 1 further comprising a float line having one end tied to said second frame member and a float carried by the free end of said float line for marking and retrieving said trap.

7. A folding crawfish trap shaped generally in the form of a truncated pyramid comprising:
   (a) A first frame member characterized by a pair of free-standing first frame legs joined by a first frame loop and extending outwardly at a preselected angle with respect to each other;

(b) A second frame member characterized by a pair of free-standing second frame legs joined by a second frame hook capable of being removably inserted in said first frame loop, said second frame legs extending outwardly at a preselected angle with respect to each other; and (c) Open mesh netting covering all of the bottom area and extending upward to cover a portion of the side area and fitted on said first frame member and said second frame member and having an access opening in the top segment thereof for entry of said crawfish in the said trap, said opening being disposed in essentially parallel relation to, and located above the bottom of said trap, and being further disposed beneath said first frame loop and said second frame hook.

8. The crawfish trap of claim 7 wherein said first frame member and said second frame member are formed of wire.

9. The crawfish trap of claim 7 wherein said first frame legs and said second frame legs are provided with curved feet on the projecting ends thereof for engagement with said netting.

10. The crawfish trap of claim 7 wherein said first frame member and said second frame member are formed of wire and the extended ends of said first frame legs and said second frame legs are curved to form first frame feet and second frame feet, respectively, for engagement with said netting.

11. The crawfish trap of claim 7 wherein the segment of said netting forming the bottom of said trap further includes a bait pocket.

12. The crawfish trap of claim 7 wherein:
(a) said first frame member and said second frame member are formed of wire and the extended ends of said first frame legs and said second frame legs are curved to form first frame feet and second frame feet, respectively, for engagement with said netting; and
(b) the segment of said netting forming the bottom of said trap further includes a bait pocket.

13. The crawfish trap of claim 12 wherein said bait pocket further comprises a segment of pocket netting fitted to said netting and fasteners removably joining said pocket netting to said netting to define said bait pocket.

14. The crawfish trap of claim 7 further comprising a float line attached to said second frame member and a float carried by the free end of said float line for marking and retrieving said trap.

15. The crawfish trap of claim 7 further comprising a float line attached to said second frame member and a float carried by the free end of said float line for marking and retrieving said trap, and wherein:
(a) said first frame member and said second frame member are formed of wire and the extended ends of said first frame legs and said second frame legs are curved to form first frame feet and second frame feet, respectively, for engagement with said netting; and
(b) the segment of said netting forming the bottom of said trap further includes a bait pocket.

16. The crawfish trap of claim 15 wherein said bait pocket further comprises a segment of pocket netting fitted to said netting and fasteners removably joining said pocket netting to said netting to define said bait pocket.

17. The crawfish trap of claim 7 wherein the area of said access opening in said netting is from about one-fourth to about one-eighth as large as the bottom area of said trap and is disposed in essentially parallel relationship to said bottom area.

18. The crawfish trap of claim 7 further comprising a float line attached to said second frame member and a float carried by the free end of said float line for marking and retrieving said trap, and wherein:
(a) said first frame member and said second frame member are formed of wire and the extended ends of said first frame legs and said second frame legs are curved to form first frame feet and second frame feet, respectively, for engagement with said netting;
(b) the segment of said netting forming the bottom of said trap further includes a bait pocket; and
(c) the area of said access opening in said netting is from about one-fourth to about one-eighth as large as the bottom area of said trap and is disposed in essentially parallel relationship to said bottom area.

19. The crawfish trap of claim 7 wherein said first frame loop is provided with a linking means for spanning the distance across said first frame loop, and said second frame hook is provided with an upward oriented bend to engage said linking means and said first frame loop when said second frame hook is fitted in said first frame loop.

20. The crawfish trap of claim 7 further comprising a float line attached to said second frame member and a float carried by the free end of said float line for marking and retrieving said trap, and wherein:
(a) said first frame member and said second frame member are formed of wire and the extended ends of said first frame legs and said second frame legs are curved to form first frame feet and second frame feet, respectively, for engagement with said netting;
(b) the segment of said netting forming the bottom of said trap further includes a bait pocket;
(c) the area of said access opening in said netting is from about one-fourth to about one-eighth as large as the bottom area of said trap and is disposed in essentially parallel relationship to said bottom area; and
(d) said first frame loop is provided with a linking means for spanning the distance across said first frame loop, and said second frame hook is provided with an upward oriented bend to engage said linking means and said first frame loop when said second frame hook is fitted in said first frame loop.

* * * * *